Figure 1:
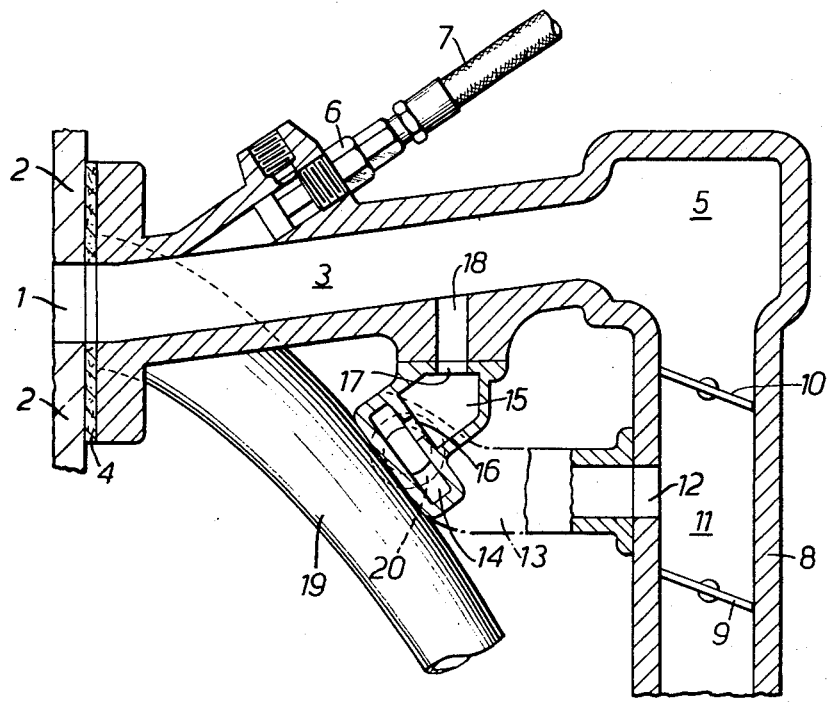

United States Patent
Jackson

[15] 3,685,503
[45] Aug. 22, 1972

[54] FUEL SUPPLY SYSTEMS

[72] Inventor: Harold Ernest Jackson, Plympton St. Mary, England Devon, England

[73] Assignee: Petrol Injection Limited, Plymouth,

[22] Filed: Aug. 31, 1970

[21] Appl. No.: 68,513

Related U.S. Application Data

[63] Continuation of Ser. No. 756,849, Sept. 3, 1968, abandoned.

[30] Foreign Application Priority Data

Sept. 4, 1967 Great Britain..........40,383/67

[52] U.S. Cl.................123/127, 123/75 B, 123/119, 123/122
[51] Int. Cl....F02m 13/04, F02m 31/00, F02b 33/00
[58] Field of Search............123/75 B, 122, 127, 32.4

[56] References Cited

UNITED STATES PATENTS

| | | | |
|---|---|---|---|
| 2,264,133 | 11/1941 | Funderburk...........123/122 D | |
| 2,793,633 | 5/1957 | Heftler et al..............123/122 | |
| 3,444,848 | 5/1969 | Lawrence..................123/122 | |
| 3,461,850 | 8/1969 | Oblander...................123/122 | |
| 1,894,510 | 1/1933 | Ensign......................123/75 B | |
| 2,793,633 | 5/1957 | Heftler......................123/122 | |
| 2,884,913 | 5/1959 | Heintz................123/32 ST R | |
| 3,443,552 | 5/1969 | Von Seggern............123/75 B | |
| 3,444,848 | 5/1969 | Lawrence..................123/122 | |
| 3,456,634 | 7/1969 | Nelson.........................123/75 | |
| 3,461,850 | 8/1969 | Oblander...................123/122 | |
| 3,543,736 | 12/1970 | Suzuki.......................123/122 | |

Primary Examiner—Laurence M. Goodridge
Assistant Examiner—Ronald B. Cox
Attorney—Holcombe, Wetherill & Brisebois

[57] ABSTRACT

A petrol injection system for an internal combustion engine in which separate main injectors in main air inlet tubes feeding such port are supplemented by a constricted and possibly heated common air inlet tube having a further injector. The supplementary inlet tube is effective during idling and low power running and the main injectors and main air inlet tubes are used for higher powers, the supplementary inlet being phased out.

5 Claims, 4 Drawing Figures

Patented Aug. 22, 1972

3,685,503

2 Sheets-Sheet 1

INVENTOR
H. E. JACKSON
BY
Holcombe, Wasserville Briebois
ATTORNEYS

FUEL SUPPLY SYSTEMS

This application is a continuation of Ser. No. 756,849, filed Sept 3, 1968 now abandoned.

This invention relates to fuel supply systems for internal combustion engines, and is especially but not exclusively suited to such engines using petrol as fuel and used in vehicles such as, for example, motor cars.

A difficulty which arises in the operation of an internal combustion engine running on petrol is that at part load operation of the engine the inlet gas velocity is low so that the air-fuel mixture is uneven leading to uneconomical use of the fuel and undesirable constituents such as carbon monoxide and unburnt hydrocarbons in the exhaust gas of the engine.

It is an object of the invention to reduce this difficulty.

According to the invention there is provided a fuel supply system for an internal combustion engine including a plurality of intake tubes connected to the inlet ports of the engine, a plurality of means for introducing fuel into the respective intake tubes separately and first means for regulating gas flow effective on the entry to the intake tubes, wherein there is provided a further tube of relatively small cross-sectional area, further means for regulating gas flow effective on the flow in the further tube and further means for introducing fuel into the further tube, said further tube also being connected to the inlet ports of the engine, said first and further regulating means being coupled so that when the engine is running at low power the entire gas flow takes place through the further tube and for higher powers the first regulating means allows the entry of gas into the intake tubes.

Figure 2:
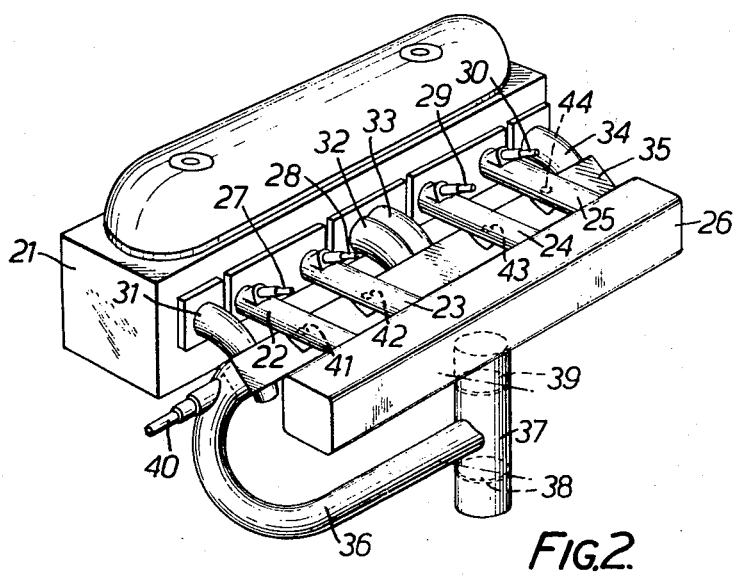
Figure 3:
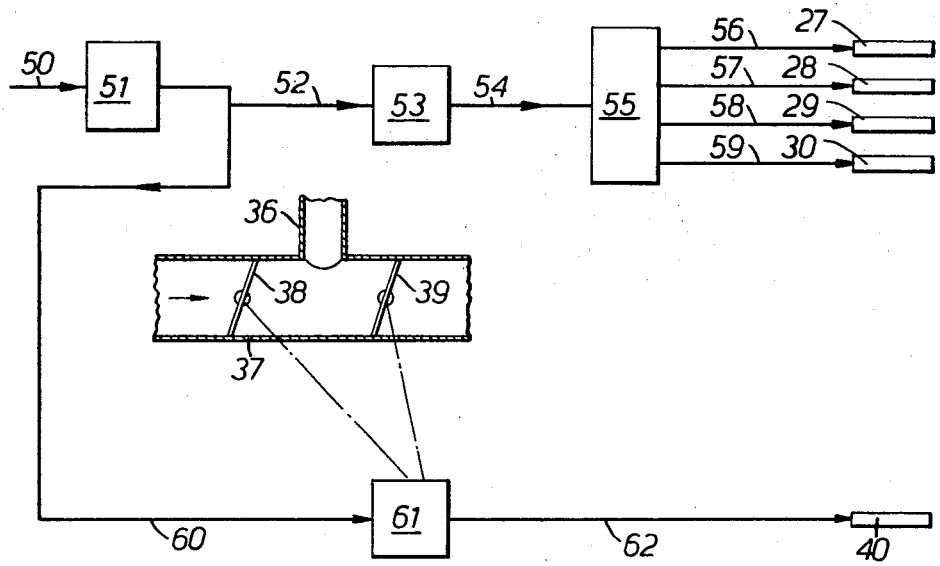
Figure 4:
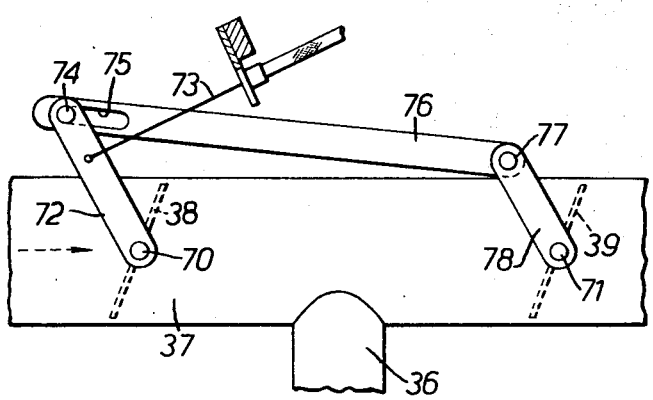

In order that the invention may be fully understood and readily carried into effect it will now be described with reference to the accompanying drawings, of which FIG. 1 is a cross-sectional diagram of one example of the fuel supply system according to the invention, FIG. 2 is a perspective diagram showing the layer of components of the example of the invention shown in FIG. 1 applied to a four-cylinder engine, FIG. 3 is a diagram of the fuel supply control for the system shown in FIGS. 1 and 2 and FIG. 4 shows a detail of the system shown in FIGS. 1, 2 and 3.

In FIG. 1 reference 1 indicates an inlet port of an internal combustion engine, the port being in the cylinder head of which part is indicated by reference 2. An intake tube 3 is provided aligned with the port 1 and joined thereto via a gasket 4 by, for example, bolts or studs which are not shown in the figure. The tube 3 is connected to a plenum chamber 5 which is common to a plurality of intake tubes. Although only one intake tube 3 is shown in FIG. 1 it will be appreciated that in general several intake tubes will be provided and there may possibly be one intake tube for each cylinder of the engine. The intake tube 3 is provided with an injection nozzle 6 coupled by means of the flexible pipe 7 to a fuel pump and regulating valve not shown in FIG. 1. It will be appreciated that each intake tube 3 will be provided with a separate injection nozzle 6 coupled to the fuel pump and regulating valve.

The plenum chamber 5 is provided with a main air entry tube 8, coupling to the atmosphere either directly or through suitable air cleaning means. The tube 8 includes first and second throttle valves 9 and 10 which as shown are of the conventional butterfly type, but they may be of any other suitable form. Between the throttle valves 9 and 10 there is a region 11 provided with a lateral hole 12 which is coupled by means of the tube 13 to a gallery 14 which extends alongside the plenum chamber 5. Constructed integrally with the gallery 14 is a manifold 15 which is coupled by means of one or more apertures 16 to the gallery 14, and manifold 15 also has outlet orifices 17 matching similar orifices 18 provided in the side walls of the intake tubes 3. The gallery 14 is joined to exhaust pipe 19 so as to be in good thermal contact therewith. Reference 20 indicates two dotted concentric circles which represent a further injection nozzle provided for the injection of fuel into the air stream flowing along the tube 13 into the gallery 14.

The operation of the arrangement shown in FIG. 1 will be described starting with the throttles 9 and 10 both closed. It should be pointed out at this stage that initially only the throttle 9 opens and after it is opened to a predetermined extent further opening of the throttle 9 leads to the throttle 10 opening and which it does at a greater rate than throttle 9, so that when throttle control is open to its fullest extent both throttles 9 and 10 are fully open. Initially therefore with the throttle 9 only open air flows into the region 11 and because the throttle 10 is closed it is directed along the tube 13 into the gallery 14 which is heated by heat transfer from the exhaust pipe 19. At the end of the gallery 14 past which the air from the tube 13 flows into the gallery 14 fuel is injected by means of the injector 20 and this fuel in the heated atmosphere and on contact with the walls of the gallery 14 is vaporized and forms an air-fuel mixture of substantially uniform proportions. The air-fuel mixture passes through the hole 16 into the manifold 15 and from there through orifices 17 and 18 into the intake tube 3, from which it is fed into the inlet port 1 of the engine. A similar air-fuel mixture is fed via the other intake tubes into the other ports of the engine.

As the throttle 9 is opened more widely an increasing volume of air is fed along the tube 13 and so that the engine is able to develop more power in the usual way. At a certain predetermined opening of the throttle 9 the throttle 10 starts to open and further opening of the throttle 9 leads to a greater opening of the throttle 10. Air can now flow into the plenum chamber 5 and by virtue of the lower resistance to air flow into the inlet tube 3 via the plenum chamber 5 a relatively greater proportion of air tends to flow via this route than via the tube 13. Further opening of throttles 9 and 10 leads to an almost complete cessation of air flow through the tube 13, nearly all of the air flowing into the plenum chamber 5 and then into the intake tube 3 and the other intake tubes.

The quantity of fuel injected by injectors 6 and 20 is regulated in known manner by reference to the openings of throttles 10 and 9 respectively, except that as the air flow in the tube 13 decreases with progressive opening of the throttle 10, the amount of fuel injected by the nozzle 20 is reduced in response to the opening of the throttle 10.

FIG. 2 is a diagram showing an approximate layout of components for a fuel supply system of the type described above with reference to FIG. 1 for a four-cylinder engine. In FIG. 2 reference 21 represents the cylinder head of the engine having four inlet ports to which intake tubes 22, 23, 24 and 25 are respectively coupled, which tubes are joined to a plenum chamber 26. The intake tubes 22 to 25 are provided respectively with injection nozzles 27, 28, 29 and 30 for the injection of fuel into the air stream. Exhaust pipes 31, 32, 33 and 34, are connected to respective exhaust ports in the cylinder head 21, and a gallery 35 is placed so as to be in good thermal contact with these pipes. The gallery 35 is connected by tube 36 to the main air inlet tube 37 feeding the plenum chamber 26. Tube 36 joins the main air intake tube 37 between first and second throttles 38 and 39. A further fuel injection nozzle 40 is provided at the end of the gallery 35 where the tube 36 joins it. Orifices 41, 42, 43 and 44 are provided coupling the gallery 35 to the intake tubes 22, 23, 24 and 25 respectively for the passage thereto of the heated air-fuel mixture formed as described above with reference to FIG. 1.

FIG. 3 is a diagram showing the regulation of the fuel supply for the fuel supply system shown in FIG. 2 on a four-cylinder engine. In FIG. 3 components which correspond to those shown in FIG. 2 carry the same reference numerals as in that Figure. The fuel, which may, for example, be petrol, is fed into the system from a suitable reservoir at 50, where a pump 51, which may be operated electrically or mechanically from the engine, pressurizes the fuel in the remainder of the system. The pressurized fuel is fed along tube 52 to regulating valve 53, coupled mechanically to the second throttle 39. The regulated fuel supply is then fed along tube 54 to a distribution device 55, coupled by respective flexible pipes 56, 57, 58 and 59, to the injection nozzles 27, 28, 29 and 30. The purpose of the distribution device 55 is to equalize the fuel flow through the four injection nozzles 27 to 30. The pressurized fuel from the pump 51 also flows along pipe 60 to a second regulating valve 61, which is coupled mechanically to both throttles 38 and 39. The metered fuel supply from the valve 61 is fed along flexible pipe 62 to the injection nozzle 40 in the end of the gallery 35.

Whilst the mechanical coupling of the valve 53 to the throttle 39 follows known practice, the coupling of the regulation valve 61 to both throttles 38 and 39 is more complex. The coupling of the throttle 38 to the device 61 is similar to that of the valve 53 to the throttle 39 in that the fuel supply to the injection nozzle 40 is increased with progressive opening of the throttle 38, the rate of increase being regulated for example by a suitable cam. As the throttle 39 opens however the fuel supply fed to the injection nozzle 40 must be reduced because the air flow past the nozzle 40 is reduced when the throttle 39 is progressively opened; a second suitably shaped cam can be used to effect this control.

Referring now to FIG. 4, where again the references used in FIG. 3 are used for those components which also appear in FIG. 3. In FIG. 4 there is shown one example of a mechanical coupling between the first throttle 38 and the second throttle 39. As in the previous examples the throttles 38 and 39 are shown as butterfly valves, mounted on shafts 70 and 71 respectively. Mounted on the shaft 70 is an arm 72 coupled by means of cable 73 to the accelerator pedal of a vehicle, for example. At the end of the arm 72 remote from the shaft 70 there is provided a pin 74 which can slide freely along slot 75 provided in the link 76. The other end of the link 76 is pivoted at the pin 77 on a second arm 78 attached to the shaft 71. The arm 78 is shorter than the arm 72.

In operation of the arrangement shown in FIG. 4 as the accelerator pedal is progressively depressed so cable 73 pulls the arm 72 to the right causing it to rotate with the shaft 70 in a clockwise direction, thus opening the throttle 38. When the stud 74 reaches the righthand end of the slot 75 the link 76 is moved to the right, thus opening the throttle 39, by means of the arm 78. The relative lengths of the arms 72 and 78 are so related taking into account the length of the slot 75 that when the throttle 38 is fully opened then so is the throttle 39.

It will be appreciated from the foregoing description that many components not contributing directly to the description of the invention have been omitted, for example, no fastening means between the various parts are shown, no springs are shown for closing the throttles and the ancilliary components of the engine shown in FIG. 3 which might otherwise be visible have been omitted for reasons of clarity. Moreover, the invention is applicable to engines having any number of inlet ports.

Although the invention has been described with reference to a system in which a subsidiary fuel supply for low throttle openings uses a heated gallery, it is not necessary for this gallery to be heated and the increased air velocity along the relatively smaller airways of the subsidiary fuel supply system will in itself lead to improved mixing of the air and fuel so that the heating of the gallery may not be necessary in certain applications. Although the heating of the gallery is carried out by means of exhaust gas in the example described above it will be appreciated that other means of heating may be used, for example, electrical heating or a water jacket through which the engine coolant circulates.

In a modification of the invention the subsidiary fuel supply may be provided by means of a carburettor instead of a fuel injection arrangement as described above.

What is claimed is:

1. A fuel supply system for an internal combustion engine having a plurality of cylinders, air supply conduit means and a plurality of main intake tubes connecting the cylinders to the air supply conduit means, said system comprising a respective main injection nozzle positioned to introduce fuel into each intake tube and main air control means operable to regulate air flow from the supply conduit means to the main intake tubes, a secondary, heated, intake tube of relatively small cross-sectional area connected to the air supply conduit means, a sole secondary injection nozzle positioned to introduce fuel directly into the heated portion of the secondary intake tube, and secondary air control means operable to regulate air flow from the supply conduit means to the secondary intake tube, the secondary intake tube also being connected to the cylinders to supply heated fuel air mixture thereto, fuel flow control means for controlling the supply of fuel to said main injection nozzles and to said secondary injection nozzle separately, a control mechanism for operating both said air control means and said fuel control means, said control mechanism being connected to operate said fuel flow control means to admit fuel to said secondary injection nozzle only, and to operate said secondary air control means to admit air to the secondary intake tube at a rate which increases with increasing fuel supply to said secondary injection nozzle, at least up to a predetermined point, as said control mechanism is moved through a first operating range, and to then operate said fuel flow control means to initiate fuel supply to said main injection nozzles and operate the main air control means to admit air to the main intake tubes at a rate which increases with increasing fuel supply to said main injection nozzles, as said control mechanism is moved beyond said first operating range.

2. A system as claimed in claim 1 in which said control mechanism is connected to reduce the supply of fuel to said secondary injection nozzle and the admission of air to said secondary intake tube as the supply of fuel to said main injection nozzles is increased.

3. A system according to claim 1 in which the secondary intake tube is heated by exhaust gas from the engine.

4. A system according to claim 1 in which the air supply conduit means includes an air inlet tube in which the air control means are located, the main air control means being positioned to receive air passed by the secondary air control means.

5. A system according to claim 1 in which the fuel flow control means is responsive to the setting of the air control means to regulate fuel flow to the main injection nozzles in dependence on the setting of the main air control means and to regulate fuel flow to the secondary injection nozzle in dependence on the setting of both the main and the secondary air control means.

* * * * *